(12) United States Patent
Hachiya

(10) Patent No.: US 7,321,223 B2
(45) Date of Patent: Jan. 22, 2008

(54) SWITCHING POWER SUPPLY APPARATUS

(75) Inventor: Yoshiaki Hachiya, Ohtsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 438 days.

(21) Appl. No.: 10/973,916

(22) Filed: Oct. 27, 2004

(65) Prior Publication Data

US 2005/0094341 A1     May 5, 2005

(30) Foreign Application Priority Data

Oct. 29, 2003     (JP) ............................. 2003-368855

(51) Int. Cl.
  *G05F 1/613*   (2006.01)
  *G05F 1/40*   (2006.01)
(52) U.S. Cl. .................... 323/224; 323/266; 323/285
(58) Field of Classification Search ................ 323/224, 323/266, 225, 285
See application file for complete search history.

(56) References Cited

U.S. PATENT DOCUMENTS

| | | | |
|---|---|---|---|
| 6,294,903 B1 * | 9/2001 | Yamashita et al. | 323/282 |
| 6,297,623 B1 * | 10/2001 | Balakrishnan et al. | 323/283 |
| 6,414,471 B1 * | 7/2002 | Balakrishnan et al. | 323/283 |
| 6,608,471 B2 * | 8/2003 | Balakrishnan et al. | 323/283 |
| 6,812,682 B2 * | 11/2004 | Hachiya | 323/284 |
| 7,049,794 B2 * | 5/2006 | Wong et al. | 323/222 |
| 2003/0107356 A1 | 6/2003 | Hachiya | |

FOREIGN PATENT DOCUMENTS

| | | |
|---|---|---|
| JP | 10191625 | 7/1998 |
| JP | 2003174769 | 6/2003 |
| JP | 2003180071 | 6/2003 |
| JP | 2003304682 | 10/2003 |

OTHER PUBLICATIONS

Chinese Office Action dated Mar. 9, 2007 with English translation.

* cited by examiner

*Primary Examiner*—Shawn Riley
(74) *Attorney, Agent, or Firm*—Stevens, Davis, Miller & Mosher, LLP

(57) ABSTRACT

In a switching power supply apparatus, the change in the voltage VOUT at the OUT terminal is transmitted to a V-I conversion circuit via an error amplification circuit and to an I-V conversion circuit, whereby the output voltage signal VL of the I-V conversion circuit is changed. The peak value of the drain current of a switching device changes since VL is used as the reference voltage of an overcurrent detection circuit. VL is transmitted to an intermittent oscillation control circuit having a hysteresis characteristic, and the switching device is subjected to intermittent oscillation. In the switching power supply apparatus, further reduction in power consumption can be attained during standby, particularly in a no-load condition.

26 Claims, 14 Drawing Sheets

SWITCHING POWER SUPPLY APPARATUS

BACKGROUND OF THE INVENTION

1. Field of the Invention

The present invention relates to a switching power supply apparatus, such as a step-down chopper switching power supply apparatus, and more particularly to a power-saving technology during standby and technologies related thereto.

2. Prior Art

PWM control systems and intermittent control systems were available as control systems for switching devices in conventional step-down chopper switching power supply apparatuses.

FIG. 10 is a circuit block diagram of a PWM control system in accordance with a first conventional example (for example, refer to Japanese Laid-open Patent Application No. Hei 10-191625), and FIG. 11 shows the operation waveforms of the system. In FIGS. 10 and 11, VOUT designates the voltage at the output terminal OUT, IOUT designates the current at the output terminal OUT, VDS designates the voltage at the DRAIN terminal of a switching device 52, IDS designates the current at the DRAIN terminal, flowing in the switching device 52, and VCC designates the voltage at the CONTROL terminal shown in FIG. 10. The circuit comprises an input capacitor 51, the switching device 52, a control circuit 53 for the switching device 52, a capacitor 54 for control circuit reference voltage, a conversion circuit 55, an output voltage detection circuit 56, and a protection device 57.

When a voltage (a voltage obtained when a commercial AC power supply rectified by a rectifier, such as a diode bridge, is smoothened by the input capacitor 51, or a DC voltage) is applied from the input terminal IN to the DRAIN terminal of the switching device 52, a current is supplied by the internal-circuit current supply circuit 58 of the control circuit 53 to the capacitor 54 for control circuit reference voltage, connected to the CONTROL terminal via a switch 59. Hence, VCC rises, and the control circuit 53 starts the ON/OFF control of the switching device 52 using a start/stop circuit 60. The ON/OFF control of the switching device 52 is carried out with reference to the CLOCK signal 62 of an oscillator 61 provided inside, and the CLOCK signal 62 is input to a flip-flop 63. The MAX DUTY signal 64 of the oscillator 61 determines the maximum ON time of the switching device 52. When VCC of the control circuit 53 rises to a predetermined value or more, a shunt regulator 65 operates, and a current is supplied to resistors 66 and 67. Hence, the voltage across the resistor 67 rises, and this voltage is compared with the SAWTOOTH signal 69 (triangular wave) of the oscillator 61, serving as the reference voltage signal of a comparator 68. The output of the comparator 68 is connected to the reset terminal of the flip-flop 63 via an OR circuit 70. This configuration is used to carry out the PWM control of the switching device 52.

When the ON/OFF control of the switching device 52 starts, power is supplied to the conversion circuit 55 comprising a diode 71, a coil 72 and an output capacitor 73, whereby VOUT rises. VOUT is detected by the output voltage detection circuit 56. When VOUT becomes a predetermined value or more, a current flows from the OUT terminal to the CONTROL terminal of the control circuit 53 while the switching device 52 is in its OFF state. Hence, VCC rises, and the PWM control of the switching device 52 is carried out.

In addition, for protection of the switching device 52, a drain current detection circuit 74 detects the DRAIN current IDS, the flip-flop 63 is reset by the OR circuit 70, and the switching device 52 is turned OFF by an AND circuit 75.

As described above, in the PWM control system, as the load at the output becomes lighter, the ON duty of the switching device is made smaller gradually (the peak value of the current IDS flowing in the switching device lowers eventually), whereby the output voltage is stabilized and power saving is attained.

Furthermore, FIG. 12 is a circuit block diagram of an intermittent control system in accordance with a second conventional example (for example, refer to Japanese Laid-open Patent Application No. 2003-180071), and FIG. 13 shows the operation waveforms of the system. In FIGS. 12 and 13, VOUT designates the voltage at the output terminal OUT, IOUT designates the current at the output terminal OUT, VO1 designates the voltage obtained when VOUT is divided by two resistors R1 and R2, VDS designates the voltage at the DRAIN terminal of a switching device 52, IFB designates the current at the FB1 terminal, and IDS designates the current at the DRAIN terminal, flowing in the switching device 52. The circuit comprises an input capacitor 51, the switching device 52, a control circuit 53 for the switching device 52, a capacitor 54 for control circuit reference voltage, a conversion circuit formed of a diode 71, a coil 72 and an output capacitor 73, an output voltage detection circuit 56, and the two resistors R1 and R2.

When a voltage (a voltage obtained when a commercial AC power supply rectified by a rectifier, such as a diode bridge, is smoothened by the input capacitor 51, or a DC voltage) is applied from the input terminal IN to the DRAIN terminal of the switching device 52, a current is supplied by the regulator 76 of the control circuit 53 to the capacitor 54 for control circuit reference voltage, connected to the BYPASS terminal. Hence, the voltage at the BYPASS terminal rises, and the control circuit 53 starts the ON/OFF control of the switching device 52 using a start/stop circuit 60. The ON/OFF control of the switching device 52 is carried out with reference to the CLOCK signal 62 of an oscillator 61 provided inside, and the CLOCK signal 62 is input to a flip-flop 63 via an AND circuit 77. The MAX DUTY signal 64 of the oscillator 61 determines the maximum ON time of the switching device 52. The voltage at the BYPASS terminal of the control circuit 53 is controlled so as to become a predetermined value at all times by the regulator 76. The FB terminal is connected to the AND circuit 77 and a constant current supply 78 connected to the BYPASS terminal. The output signal of an OR circuit 79, to which the inversion signal of the MAX DUTY signal 64 of the oscillator 61 and the output signal of a drain current detection circuit 74 are input, is input to the reset terminal of the flip-flop 63. The intermittent operation of the switching device 52 is controlled depending on the voltage difference across the FB terminal and the SOURCE terminal to which a capacitor C4 is connected.

When the ON/OFF control of the switching device 52 starts, power is supplied to the conversion circuit comprising the diode 71, the coil 72 and the output capacitor 73, and the voltage VOUT at the output terminal OUT rises. VOUT is detected by the resistors R1 and R2 and the output voltage detection circuit 56. When VOUT becomes a predetermined value or more (when the voltage at the VO1 terminal becomes the reference voltage or more of a comparator 80 to be exact), a P-channel MOSFET 82 serving as a switching device is turned ON by the comparator 80 and a NAND circuit 81. This increases the amount of the current supplied to a current mirror circuit formed of N-channel MOSFETs 83 and 84 serving as two switching devices. Hence, the current IFB at the FB1 terminal increases, and the potential at the FB terminal connected to the capacitor C4 lowers, whereby the control circuit 53 suspends or stops the switching device 52. When VOUT becomes the predetermined value or more and when the output signal of the NAND circuit 81 becomes L (low), a P-channel MOSFET 85 serving as a switching device turns ON, and the current of a constant current supply 86 is supplied to the resistor R2 via the VO1 terminal. Hence, the voltage at the VO1 terminal rises slightly; that is, VOUT also rises slightly, whereby a hysteresis characteristic is provided so that the voltage at the output terminal OUT is stabilized.

When the switching device 52 turns OFF, power supply to the output terminal OUT is stopped, and VOUT lowers gradually. When VOUT becomes the predetermined value or less, the P-channel MOSFET 82 turns OFF, and the IFB current lowers. Hence, the potential at the FB terminal rises, and the switching device 52 is ON/OFF controlled again. This intermittent control is carried out hereafter. The start and stop of the output voltage detection circuit 56 will be described below. When the ON/OFF control of the switching device 52 is started, power is supplied from the choke coil 72 to the output capacitor 73, whereby the voltage of the output capacitor 73 rises. In the output voltage detection circuit 56, power is supplied from the output capacitor 73 via a regulator 90 to the VCC terminal to which the capacitor C5 is connected. When the voltage at the VCC terminal becomes the reference voltage or more of a comparator 89, the output voltage detection circuit 56 starts operation. When the voltage becomes the reference voltage or less of the comparator 89 (a state wherein power supply from the output capacitor 73 to the VCC terminal is insufficient, for example, the output at the output terminal is overloaded or short-circuited, or the input voltage has lowered significantly), the output voltage detection circuit 56 stops operation. The regulator 90 controls the voltage VCC so that the voltage becomes the reference voltage (starting voltage) of the comparator 89 at all times. Hence, the output signal of the comparator 89 is controlled so as to become a high signal at all times. The comparator 89 shown in FIG. 12 serves as a circuit for starting/stopping the output voltage detection circuit 56. When the reference voltage of the comparator 89 is provided with a hysteresis characteristic, the output voltage detection circuit 56 operates stably. Numerals 87 and 88 designate current supplies.

In addition, for protection of the switching device 52, the drain current detection circuit 74 detects the DRAIN current IDS, and the switching device 52 is turned OFF.

As described above, in the intermittent control system, as the load at the output becomes lighter, the number of switching times of the switching device is decreased gradually, whereby the output voltage is stabilized and power saving is attained.

However, in the nonisolated power supply wherein the switching device is on the high side and the output voltage detection section is on the low side as described above, further reduction in power consumption during standby is difficult in the case when the currently available PWM control or intermittent control is used.

In other words, in the above-mentioned conventional PWM control system and intermittent control system, further reduction in power consumption during standby, particularly in a no-load condition, cannot be expected because of the following reasons.

(1) In a no-load condition in the PWM control system, the peak value of the current flowing in the switching device lowers. However, the number of switching times is constant regardless of load condition. Hence, further reduction in power consumption is difficult.

(2) In a no-load condition in the intermittent control system, the number of switching times of the switching device decreases. However, the peak value of the current flowing in the switching device is constant. Hence, further reduction in power consumption is difficult.

Furthermore, in the case when the frequency during the intermittent control is in the audible frequency range, since the peak value of the current flowing in the switching device is constant, the coil generates noise.

SUMMARY OF THE INVENTION

In order to solve the above-mentioned problems, a switching power supply apparatus in accordance with the present invention comprises a switching device for turning ON/OFF a first DC voltage, a conversion circuit for converting the output of the switching device into a second DC voltage, a control circuit for PWM controlling the switching device, a voltage detection circuit for detecting the output voltage of the conversion circuit, and an intermittent oscillation control circuit for stopping the switching operation of the switching device when the change in the output of the voltage detection circuit is larger than a predetermined reference value in the case when a load connected to the conversion circuit is light.

With the above-mentioned configuration, further reduction in power consumption can be attained during standby, particularly in a no-load condition, in comparison with the conventional examples.

In addition, a switching power supply apparatus in accordance with the present invention comprises a switching device for turning ON/OFF a first DC voltage, an oscillator for generating a signal for ON/OFF controlling the switching device, an I-V conversion circuit, provided with an external signal input terminal, for outputting a voltage corresponding to the current flowing in the external signal input terminal, an overcurrent detection circuit for detecting the current flowing in the switching device by using the output voltage of the I-V conversion circuit as a reference voltage and for turning OFF the switching device, an intermittent oscillation control circuit for stopping the switching operation of the switching device when the output voltage of the I-V conversion circuit becomes lower than a light-load detection lower-limit voltage and for restarting the switching operation of the switching device when the output voltage becomes higher than a light-load detection upper-limit voltage, a conversion circuit, connected to the switching device, for converting the output of the switching device into a second DC voltage, an error amplifier for detecting the second DC voltage and for amplifying the potential difference between the second DC voltage and a predetermined reference voltage, and a V-I conversion circuit, having an output terminal connected to the external signal input terminal of the I-V conversion circuit, for converting the output voltage of the error amplifier into a current.

With the above-mentioned configuration, in addition to the above-mentioned effect, the following effect is obtained. When the output load becomes light, intermittent oscillation control is carried out after the peak value of the current flowing in the switching device lowers, whereby noise from the coil in the apparatus can be prevented remarkably.

A switching power supply apparatus in accordance with the present invention comprises:

a switching device for turning ON/OFF a first DC voltage supplied via an input terminal, an input-side smoothing capacitor, the high-potential side of which is connected to the input terminal and the low-potential side of which is connected to a ground terminal, a control circuit having an oscillator for generating a signal for ON/OFF controlling the switching device; an I-V conversion circuit, connected to the input terminal via a first regulator and provided with an external signal input terminal, for outputting a voltage corresponding to the current flowing in the external signal input terminal; an overcurrent detection circuit for detecting the current flowing in the switching device by using the output voltage of the I-V conversion circuit as a reference voltage and for turned OFF the switching device; and an intermittent oscillation control circuit for stopping the switching operation of the switching device when the output voltage of the I-V conversion circuit becomes lower than a light-load detection lower-limit voltage and for restarting the switching operation of the switching device when the output voltage of the I-V conversion circuit becomes higher than a light-load detection upper-limit voltage, a first capacitor, connected to the input terminal via the first regulator, for generating the reference voltage of the control circuit, a conversion circuit, operating by using the potential at the ground terminal as a reference potential and connected to the output of the switching device, for converting the output, turned ON/OFF by the switching device, into a second DC voltage, the absolute value of which is smaller than that of the first DC voltage, and for outputting the second DC voltage to an output terminal, an output-side smoothing capacitor, the high-potential side of which is connected to the output terminal and the low-potential side of which is connected to the ground terminal, a first resistor, one end of which is connected to the output terminal, a second resistor, one end of which is connected to the other end of the first resistor and the other end of which is connected to the ground terminal, and an output voltage detection circuit operating by using the potential at the ground terminal as a reference potential and having a second capacitor, connected to the output terminal via a second regulator, for generating a power supply voltage; an error amplifier, to which the voltage obtained by dividing the voltage at the output terminal using the first resistor and the second resistor is input, for amplifying the potential difference between the obtained voltage and a predetermined reference voltage; and a V-I conversion circuit, the output terminal of which is connected to the external signal input terminal of the control circuit, for converting the output voltage of the error amplifier into a current.

With the above-mentioned configuration, the second capacitor is connected to the output terminal via the second regulator and generates a power supply voltage, whereby the output voltage can be lowered.

The above-mentioned configuration has a second capacitor, connected to the input terminal via the second regulator, for generating the power supply voltage, instead of the second capacitor, connected to the output terminal via the second regulator, for generating the power supply voltage.

A switching power supply apparatus in accordance with the present invention comprises:

a switching device for turning ON/OFF a first DC voltage supplied via an input terminal, an input-side smoothing capacitor, the high-potential side of which is connected to the input terminal and the low-potential side of which is connected to a ground terminal, a control circuit having an oscillator for generating a signal for ON/OFF controlling the switching device; an I-V conversion circuit, connected to the input terminal via a first regulator and provided with an external signal input terminal, for outputting a voltage corresponding to the current flowing in the external signal input terminal; an overcurrent detection circuit for detecting the current flowing in the switching device by using the output voltage of the I-V conversion circuit as a reference voltage and for turned OFF the switching device; and an intermittent oscillation control circuit for stopping the switching operation of the switching device when the output voltage of the I-V conversion circuit becomes lower than a light-load detection lower-limit voltage and for restarting the switching operation of the switching device when the output voltage of the I-V conversion circuit becomes higher than a light-load detection upper-limit voltage, a first capacitor, connected to the input terminal via the first regulator, for generating the reference voltage of the control circuit, a conversion circuit, operating by using the potential at an output terminal as a reference potential and connected to the output of the switching device, for converting the output, turned ON/OFF by the switching device, into a second DC voltage, the absolute value of which is smaller than that of the first DC voltage, and for outputting the second DC voltage to the ground terminal, an output-side smoothing capacitor, the high-potential side of which is connected to the ground terminal and the low-potential side of which is connected to the output terminal, a first resistor, one end of which is connected to the ground terminal, a second resistor, one end of which is connected to the other end of the first resistor and the other end of which is connected to the output terminal, and an output voltage detection circuit operating by using the potential at the output terminal as a reference potential and having a second capacitor, connected to the ground terminal via a second regulator, for generating a power supply voltage; an error amplifier, to which the voltage obtained by dividing the voltage at the output terminal using the first resistor and the second resistor is input, for amplifying the potential difference between the obtained voltage and a predetermined reference voltage; and a V-I conversion circuit, the output terminal of which is connected to the external signal input terminal of the control circuit, for converting the output voltage of the error amplifier into a current.

The above-mentioned configuration has a second capacitor, connected to the input terminal via the second regulator, for generating the power supply voltage, instead of the second capacitor, connected to the ground terminal via the second regulator, for generating the power supply voltage.

In the above-mentioned configuration, the output voltage detection circuit and the control circuit are configured so that the peak value of the current flowing when the switching device is in the ON state changes linearly with respect to the change in the voltage at the output terminal.

With the above-mentioned configuration, further reduction in power consumption can be attained stably during standby, particularly in a no-load condition.

The above-mentioned configuration has a diode, the cathode of which is connected to the external signal input terminal of the I-V conversion circuit and the anode of which is connected to the output terminal of the switching device.

With the above-mentioned configuration, further reduction in power consumption can be attained stably during standby, particularly in a no-load condition, since the voltage at the external signal input terminal of the I-V conversion circuit can be fixed.

In the above-mentioned configuration, the switching device is a high-voltage transistor.

In the above-mentioned configuration, the conversion circuit comprises a series circuit of a diode, a coil and a capacitor.

The above-mentioned configuration is provided with overcurrent protection means.

With the above-mentioned configuration, the switching device can be protected, and the safety of the switching power supply apparatus is improved.

The above-mentioned configuration is provided with overcurrent protection means and overheat protection means.

PREFERRED EMBODIMENTS

Figure 1:
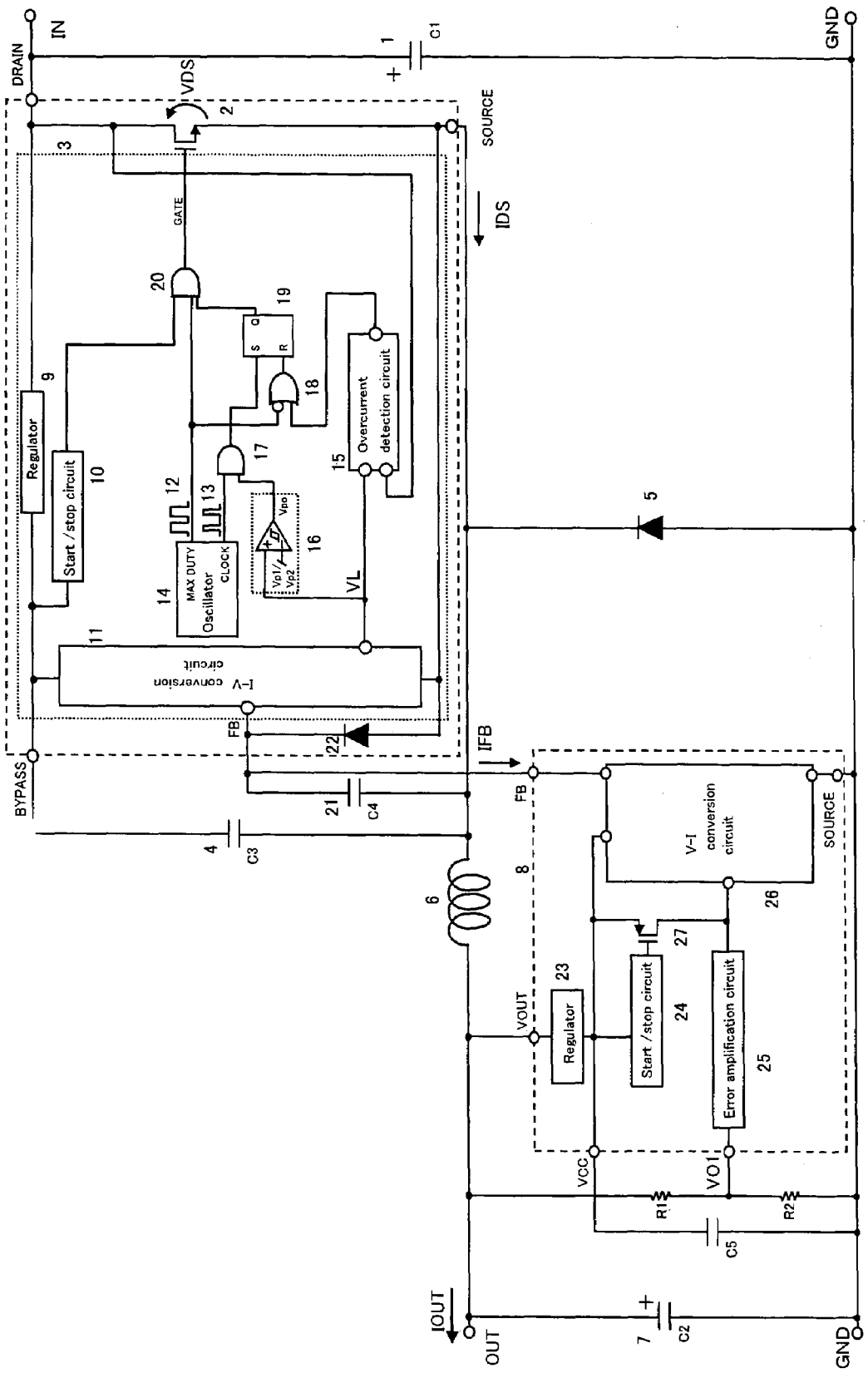
FIG. 1 is a circuit block diagram of a switching power supply apparatus in accordance with a first embodiment of the present invention.

Embodiments in accordance with the present invention will be described below referring to the drawings.

Embodiment 1

Figure 2:
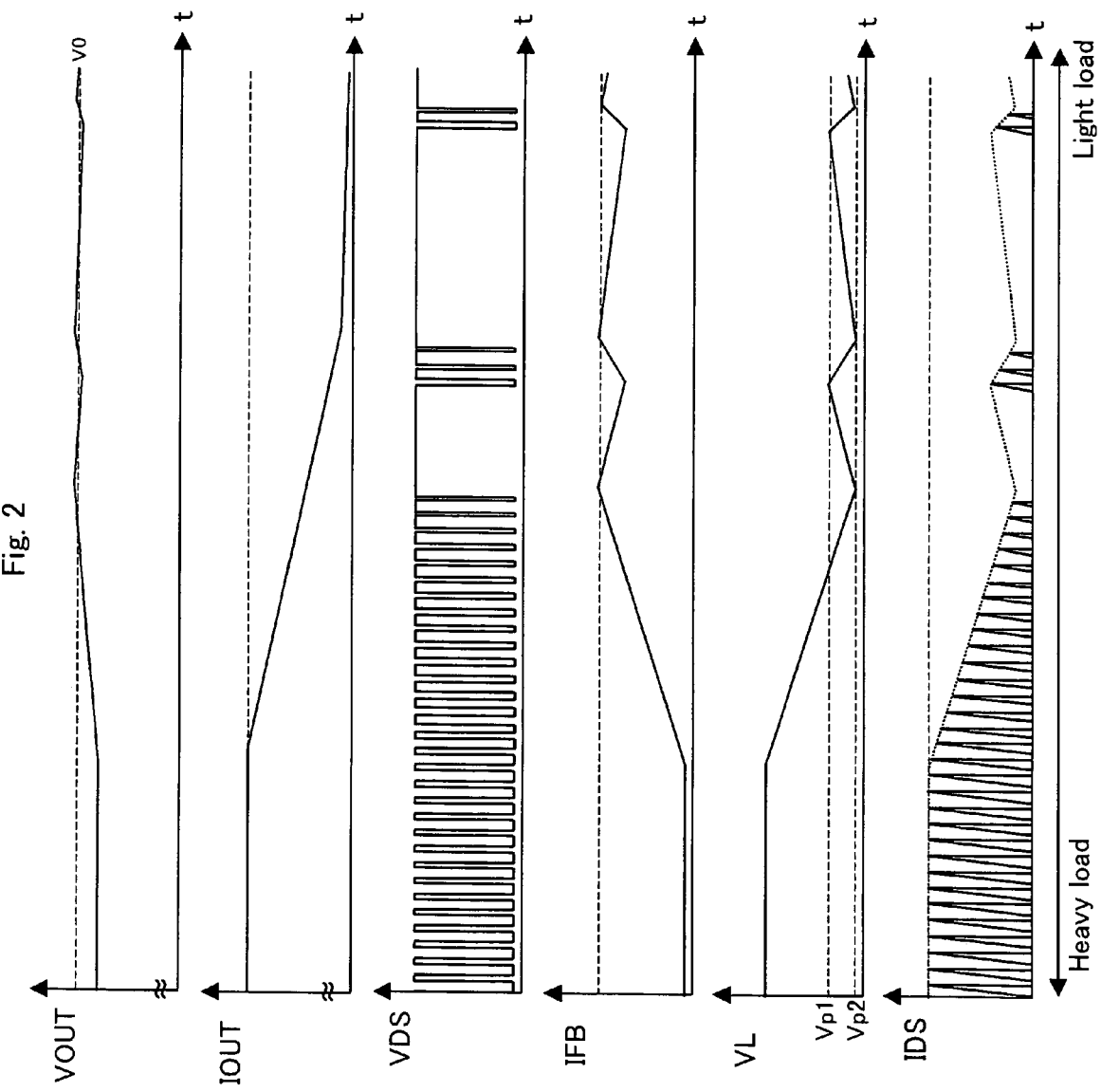
FIG. 2 is a graph showing the operation waveforms of the switching power supply apparatus shown in FIG. 1.

FIG. 1 is a circuit block diagram of a switching power supply apparatus in accordance with a first embodiment of the present invention. FIG. 2 shows the operation waveforms of the switching power supply apparatus in accordance with the first embodiment of the present invention at the time when the load condition at the output thereof is changed from a heavy load to a light load. In FIGS. 1 and 2, VOUT designates the voltage at the output terminal OUT, IOUT designates the current at the output terminal OUT, VDS designates the voltage at the DRAIN terminal of a switching device 2, IFB designates the current at the FB1 terminal, and IDS designates the current at the DRAIN terminal, flowing in the switching device 2. The circuit comprises an input capacitor 1, the switching device 2, a control circuit 3 for the switching device 2, a capacitor 4 for control circuit reference voltage, a conversion circuit formed of a diode 5, a coil 6 and an output capacitor 7, an output voltage detection circuit 8, and two resistors R1 and R2. The switching device 2 is formed of a high-voltage transistor, for example.

As shown in FIG. 1, the control circuit 3 comprises a regulator 9, connected to the DRAIN terminal, for controlling the voltage at the BYPASS terminal (the reference voltage of the control circuit 3) so as to be constant at all times, a start/stop circuit 10 for starting the control circuit 3 when the voltage at the BYPASS terminal becomes a predetermined value or more and for stopping the control circuit 3 when the voltage becomes the predetermined value or less, an I-V conversion circuit 11, to which a power supply voltage is supplied from the BYPASS terminal, for outputting a current flowing from the FB terminal to the outside of the control circuit 3 as an output voltage signal VL, an oscillator 14 for outputting a MAX DUTY signal 12 for determining the maximum on duty of the switching device 2 and for outputting a CLOCK signal 13 serving as an internal reference signal, an overcurrent detection circuit 15 for detecting the DRAIN current flowing in the switching device 2 by using the output voltage signal VL of the I-V conversion circuit 11 as a reference voltage and for turning OFF the switching device 2, an intermittent oscillation control circuit 16 for suspending or stopping the ON/OFF control of the switching device 2 when the output voltage signal VL of the I-V conversion circuit 11 becomes lower than a reference voltage Vp1 (at this time, the reference voltage Vp1 changes to Vp2) and for restarting the ON/OFF control of the switching device 2 when the output voltage signal VL of the I-V conversion circuit 11 becomes higher than Vp2, an AND circuit 17, to which the output of the intermittent oscillation control circuit 16 and the CLOCK signal 13 of the oscillator 14 are input, for outputting the output signal thereof to the set terminal of a flip-flop 19, an OR circuit 18, to which the inversion signal of the MAX DUTY signal 12 of the oscillator 14 and the output signal of the overcurrent detection circuit 15 are input, for outputting the output signal thereof to the reset terminal of the flip-flop 19, the flip-flop 19, and an AND circuit 20, to which the output signal of the start/stop circuit 10, the MAX DUTY signal 12 of the oscillator 14 and the output signal of the flip-flop 19 are input, for controlling the GATE terminal of the switching device 2. A capacitor 21 and a diode 22 are connected between the FB terminal of the I-V conversion circuit and the SOURCE terminal.

Furthermore, the output voltage detection circuit 8 comprises a regulator 23, to which the output voltage VOUT is input, for controlling the reference voltage VCC thereof so as to be constant, a start/stop circuit 24 for starting the output voltage detection circuit 8 when VCC becomes a predetermined value or more and for stopping the output voltage detection circuit 8 when the voltage becomes the predetermined value or less, an error amplification circuit 25, to which the signal obtained when the output voltage VOUT is divided by the two resistors R1 and R2 is input, for amplifying the potential difference between the input signal and the internal reference voltage thereof and for outputting the amplified signal, a V-I conversion circuit 26 for converting the input voltage signal from the error amplification circuit 25 into the current IFB flowing at the FB1 terminal, and a P-channel MOSFET 27 for transmitting the signal of the error amplification circuit 25 to the V-I conversion circuit 26 when the output signal of the start/stop circuit 24 becomes H (high).

When a voltage (a voltage obtained when a commercial AC power supply rectified by a rectifier, such as a diode bridge, is smoothened by the input capacitor 1, or a DC voltage) is applied from the input terminal IN to the DRAIN terminal of the switching device 2, a current is supplied by the regulator 9 of the control circuit 3 to the capacitor 4 for control circuit reference voltage, connected to the BYPASS terminal. Hence, the voltage at the BYPASS terminal rises. The control circuit 3 is thus activated by the start/stop circuit 10 and starts the ON/OFF control of the switching device 2. When the ON/OFF control of the switching device 2 is started, power is supplied to the conversion circuit formed of the diode 5, the coil 6 and the output capacitor 7, and the voltage VOUT at the output terminal OUT rises. When VOUT rises, the regulator 23 is activated, a current is supplied to a capacitor C5, and the reference voltage VCC of the output voltage detection circuit 8 rises. When the reference voltage VCC is the predetermined value or more of the start/stop circuit 24, the output voltage detection circuit is started, and the voltage VOUT at the output terminal OUT begins to be detected by the error amplification circuit 25. The voltage VOUT is detected by the two resistors R1 and R2 and the output voltage detection circuit 8. When the voltage VOUT becomes a desired voltage or more (when the voltage at the VO1 terminal becomes the reference voltage or more of the error amplification circuit 25 to be exact), the error amplification circuit 25 amplifies the voltage difference between the reference voltage thereof and the voltage at the VO1 terminal and transmits the amplified signal to the V-I conversion circuit 26. When the voltage VOUT, having the desired voltage or more, rises, the output voltage signal of the error amplification circuit 25 lowers linearly and is converted by the V-I conversion circuit 26 so that the current IFB at the FB1 terminal increases. Furthermore, the output voltage signal VL of the I-V conversion circuit 11 lowers. The output voltage signal VL is used as the reference voltage of the overcurrent detection circuit 15. When the output voltage signal VL lowers, the peak value of the DRAIN current flowing in the switching device 2 is lowered, whereby PWM control is carried out in the current mode.

Furthermore, when the voltage VOUT becomes the desired voltage or more (in a light load condition as an output load condition) and when the output voltage signal VL of the I-V conversion circuit 11 becomes the light-load detection lower-limit voltage or less of the intermittent oscillation control circuit 16, that is, the reference voltage Vp1 or less (FIG. 2E), it is judged that the output load condition is a light load condition. The intermittent oscillation control circuit 16 suspends or stops the switching device 2. Since the ON/OFF control of the switching device 2 is stopped, power supply to the output is stopped, and the voltage VOUT lowers gradually. As the voltage VOUT lowers, the output voltage signal VL rises gradually. When the output voltage signal VL becomes the light-load detection upper-limit voltage or more of the intermittent oscillation control circuit 16, that is, the reference voltage Vp2 or more, the ON/OFF control of the switching device 2 is restarted, and power is supplied to the output. Hence, VOUT rises again, and the ON/OFF control of the switching device 2 is stopped. In the light load condition, intermittent control wherein the above-mentioned operation is repeated is carried out.

In the case when the switching power supply apparatus in accordance with the first embodiment of the present invention described above is used, the peak value of the current flowing in the switching device 2 lowers as the output load condition becomes lighter. Hence, PWM control is carried out. Furthermore, when the output load condition becomes close to a no-load condition, intermittent control is carried out. Therefore, further power-saving during standby can be attained. In addition, since the peak value of the current flowing in the switching device 2 lowers, noise from the coil is reduced.

Embodiment 2

Figure 3:
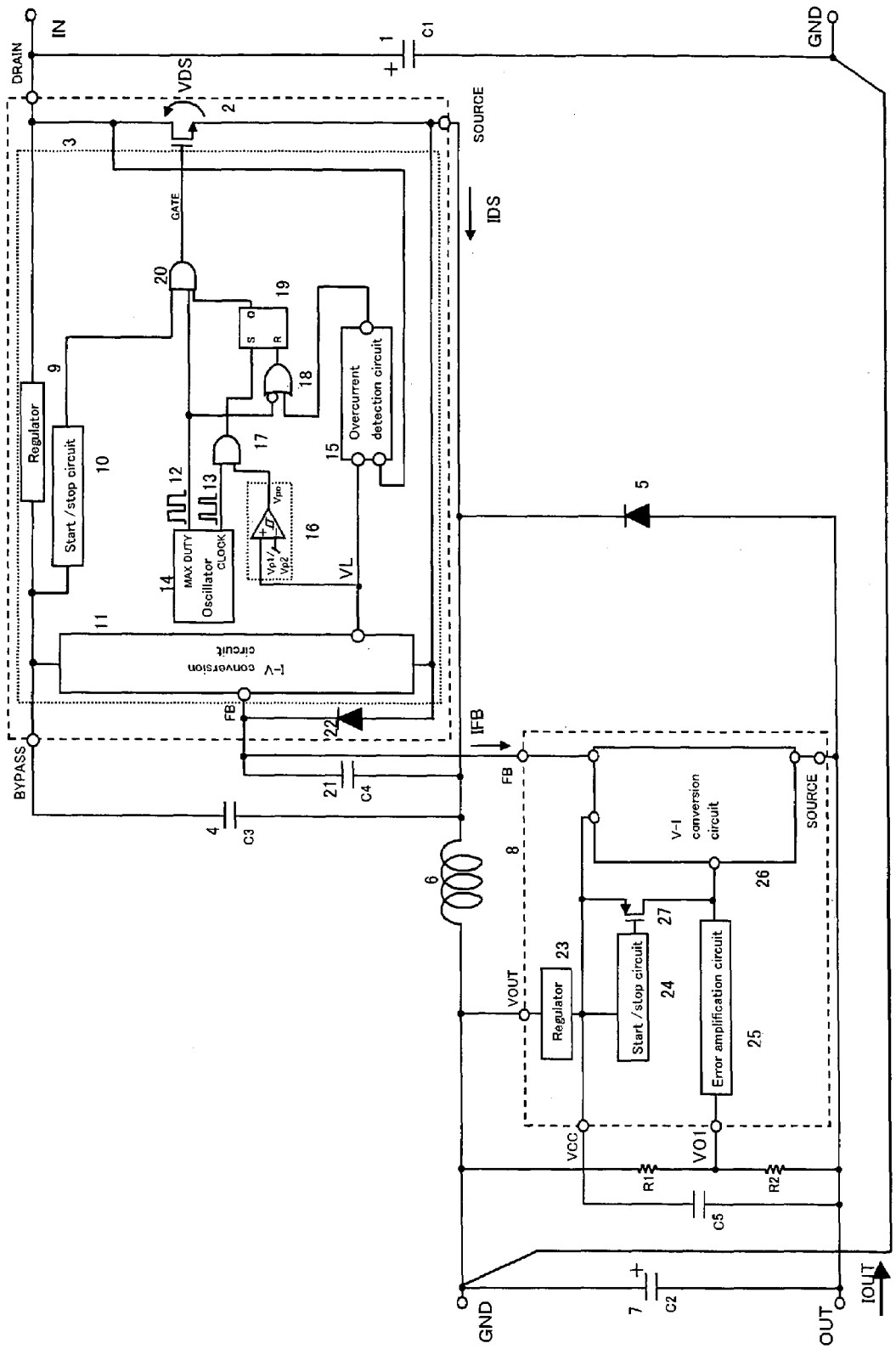
FIG. 3 is a circuit block diagram of a switching power supply apparatus in accordance with a second embodiment of the present invention.

FIG. 3 is a circuit block diagram of a switching power supply apparatus in accordance with a second embodiment of the present invention. In the first embodiment, the negative (−) terminal of the input capacitor 1 is connected to the anode of the diode 5 shown in FIG. 1. However, in the second embodiment, the negative (−) terminal of the input capacitor 1 is connected to the positive (+) terminal of the output capacitor 7, whereby a negative output power supply is attained. The operation of the power supply apparatus is the same as that of the switching power supply apparatus in accordance with the first embodiment of the present invention.

In the case when this kind of switching power supply apparatus in accordance with the second embodiment of the present invention is used, the same effect as that of the first embodiment of the present invention is obtained, and the polarity of the output voltage can be changed easily.

Embodiment 3

Figure 4:
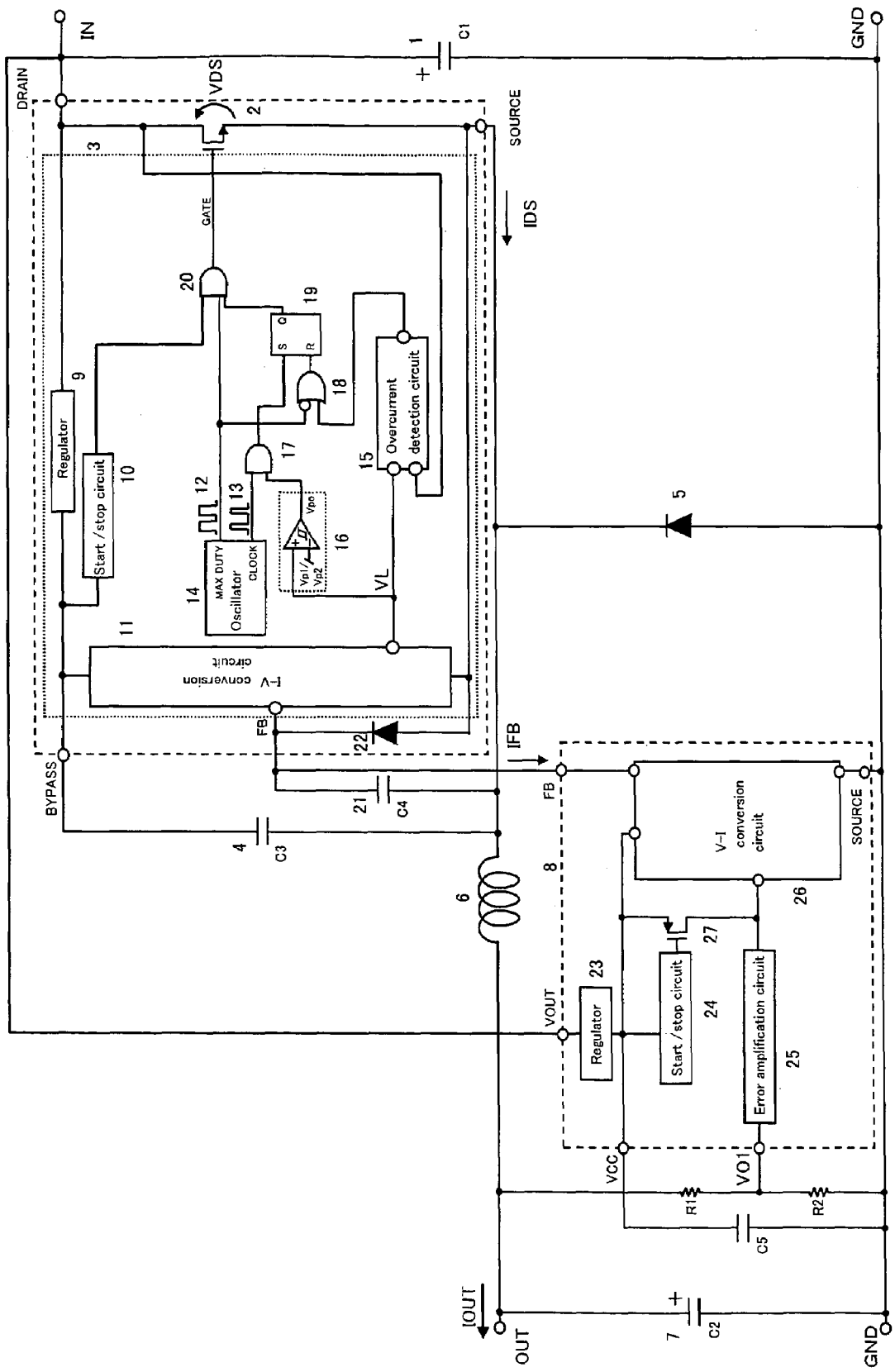
FIG. 4 is a circuit block diagram of a switching power supply apparatus in accordance with a third embodiment of the present invention.

FIG. 4 is a circuit block diagram of a switching power supply apparatus in accordance with a third embodiment of the present invention. In the first embodiment, power to the regulator 23 of the output voltage detection circuit 8 shown in FIG. 1 is supplied from the output terminal OUT. However, in the third embodiment, power is directly supplied from the input terminal IN. The operation of the power supply apparatus is the same as that of the switching power supply apparatus in accordance with the first embodiment of the present invention.

In the case when this kind of switching power supply apparatus in accordance with the third embodiment of the present invention is used, the same effect as that of the first embodiment of the present invention is obtained, and the output voltage can be lowered easily.

Even in the second embodiment shown in FIG. 3, power may also be supplied directly from the input terminal IN, instead of from the output terminal OUT.

Embodiment 4

Figure 5:
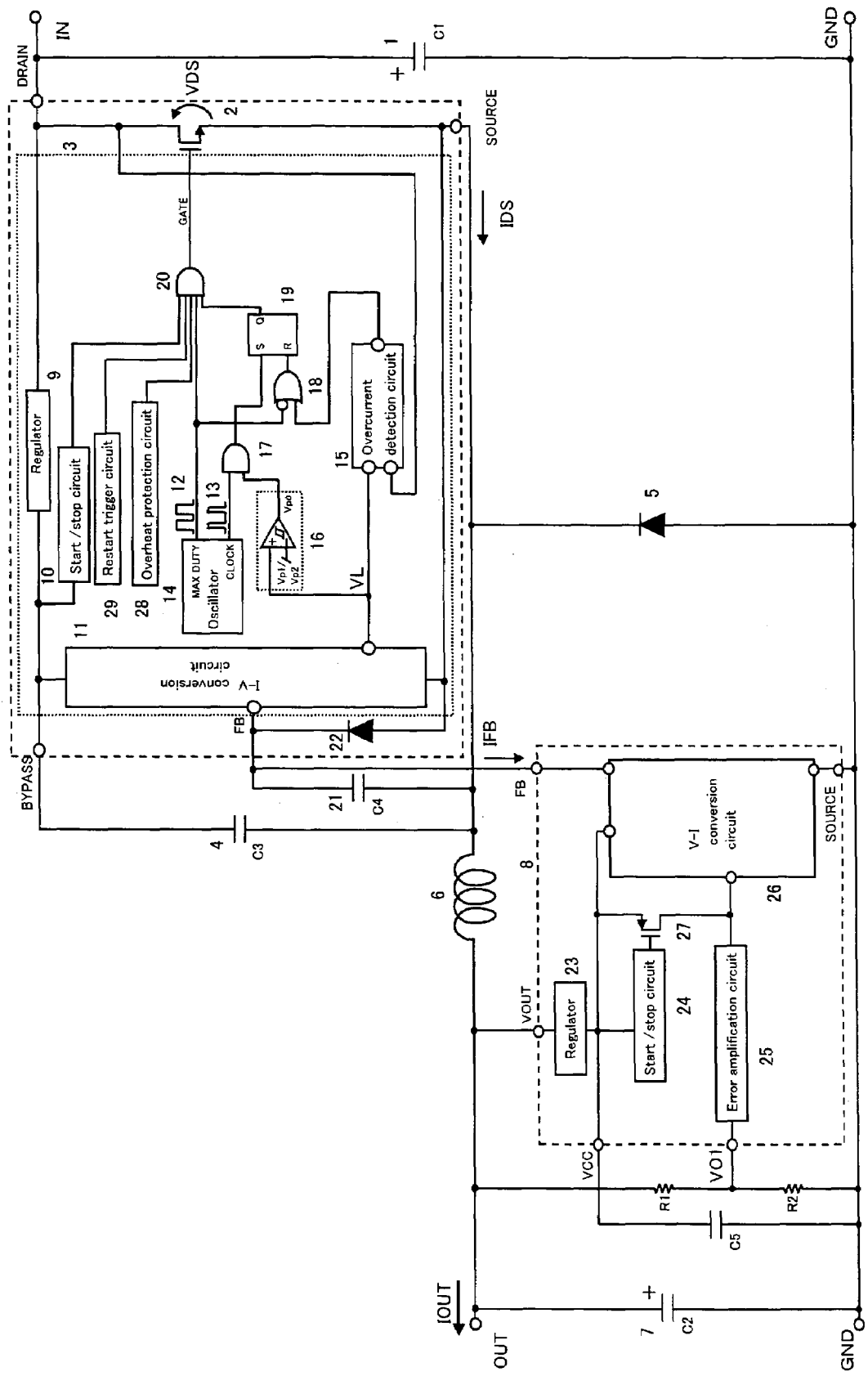
FIG. 5 is a circuit block diagram of a switching power supply apparatus in accordance with a fourth embodiment of the present invention.

FIG. 5 is a circuit block diagram of a switching power supply apparatus in accordance with a fourth embodiment of the present invention. In this embodiment, an overheat protection circuit 28 and a restart trigger circuit 29 are added to the control circuit 3 in accordance with the first embodiment shown in FIG. 1. In other words, the overheat protection circuit 28 for carrying out a protection function wherein when the junction temperature of the switching device 2 rises to a predetermined temperature or more, the ON/OFF control of the switching device 2 is forcibly stopped and the restart trigger circuit 29 for canceling the stop state caused by the overheat protection circuit 28 are connected to the input terminals of the AND circuit 20. The operation of the power supply apparatus is the same as that of the switching power supply apparatus in accordance with the first embodiment of the present invention.

In the case when this kind of switching power supply apparatus in accordance with the fourth embodiment of the present invention is used, the same effect as that of the first embodiment of the present invention is obtained, the switching device can be protected, and the safety of the switching power supply apparatus can be attained.

Embodiment 5

Figure 6A:
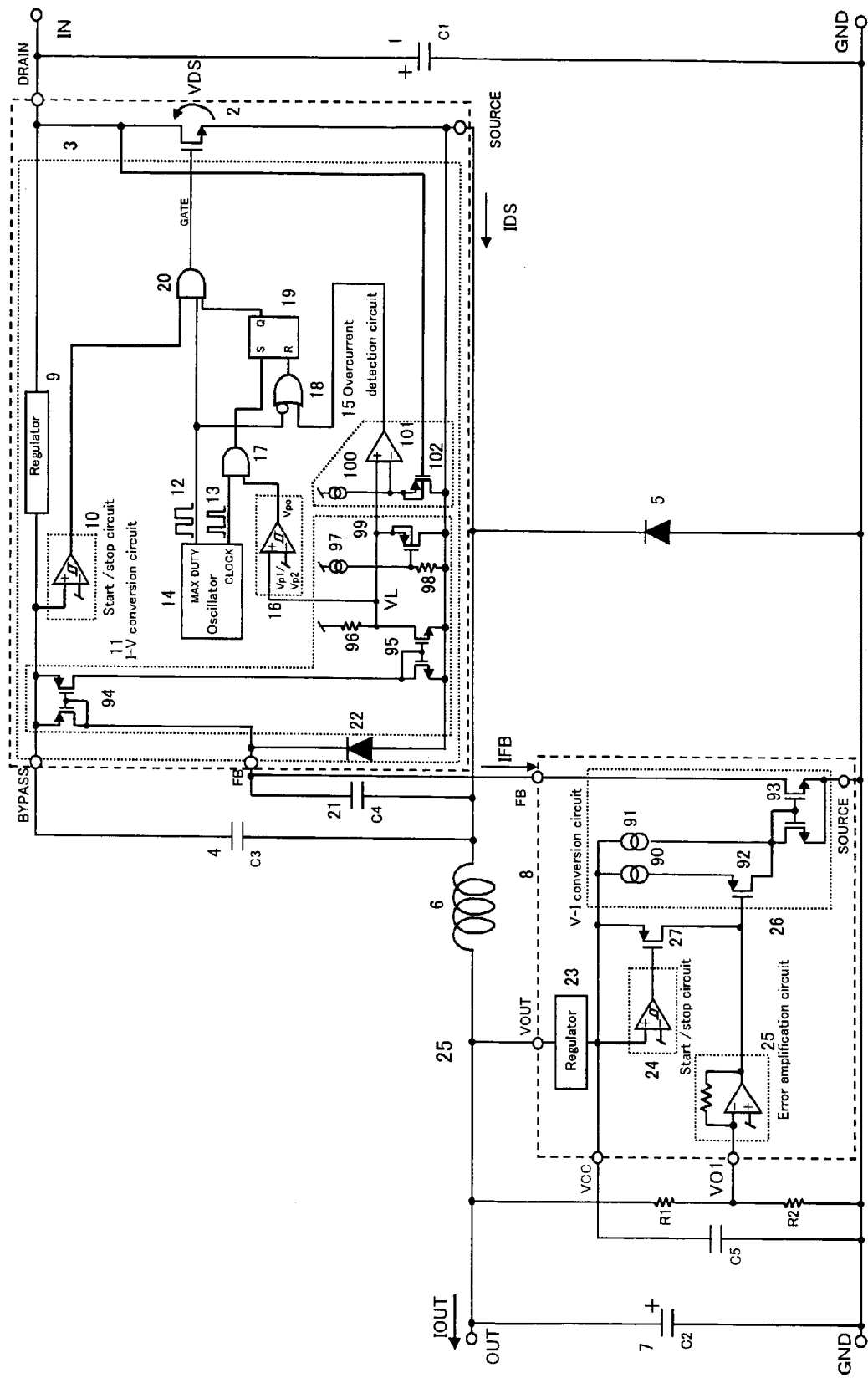
FIG. 6A is a circuit block diagram of a switching power supply apparatus in accordance with a fifth embodiment of the present invention.

FIG. 6A is a circuit block diagram of a switching power supply apparatus in accordance with a fifth embodiment of the present invention. The start/stop circuit 10, the I-V conversion circuit 11 and the overcurrent detection circuit 15 of the control circuit 3, and the start/stop circuit 24, the error amplification circuit 25 and the V-I conversion circuit 26 of the output voltage detection circuit 8 in accordance with the first embodiment shown in FIG. 1 are each formed of a first specific circuit in this embodiment. The operation of the power supply apparatus is the same as that of the switching power supply apparatus in accordance with the first embodiment of the present invention.

In the I-V conversion circuit 11, numerals 94 and 95 designate mirror circuits, numerals 96 and 98 designate resistors, numeral 97 designates a constant current supply, and numeral 99 designates a transistor. In the overcurrent detection circuit 15, numeral 100 designates a constant current supply, numeral 101 designates a comparator, and numeral 102 designates a transistor. The start/stop circuit 10 of the control circuit 3 and the start/stop circuit 24 of the output voltage detection circuit 8 are each formed of a comparator having a hysteresis characteristic. The error amplification circuit 25 is formed of an operational amplifier and a resistor. In the V-I conversion circuit 26, numerals 90 and 91 designate constant current supplies, numeral 92 designates a P-channel MOSFET, and numeral 93 designates a mirror circuit.

In the case when this kind of switching power supply apparatus in accordance with the fifth embodiment of the present invention is used, the same effect as that of the first embodiment of the present invention is obtained.

Figure 6B:
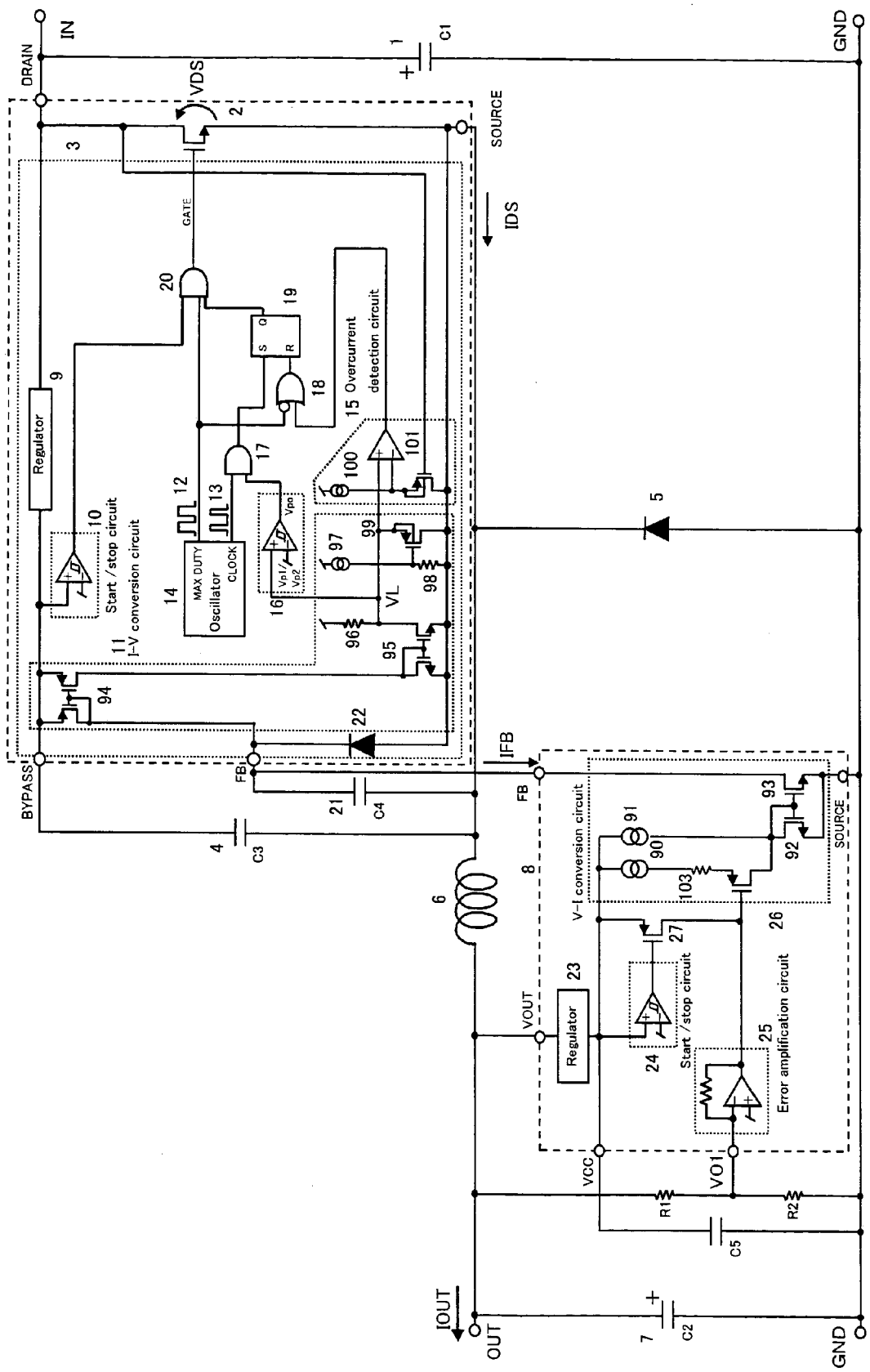
FIG. 6B is a circuit block diagram of a switching power supply apparatus in accordance with a modified embodiment of the fifth embodiment shown in FIG. 6A.

FIG. 6B is a circuit block diagram of a switching power supply apparatus in accordance with a modified embodiment of the fifth embodiment shown in FIG. 6A. The configuration shown in FIG. 6B differs from that shown in FIG. 6A in that a resistor 103 is inserted between the constant current supply 90 and the P-channel MOSFET 92 of the V-I conversion circuit 26.

With the insertion of the resistor 103 at this position, the response linearity of the V-I conversion circuit is improved, and desired operation can be obtained more easily.

This will be described below specifically. First, in the case when the P-channel MOSFET 92 is driven, since VCC has been applied to the drain in advance, the drain current begins to be saturated when the gate voltage becomes nearly the same value as that of VCC. Because of the characteristic of the MOSFET, in the vicinity of this voltage, the drain current serving as the output signal does not increase linearly with respect to the gate voltage serving as the input signal.

If the current drive capability of the P-channel MOSFET 92 is insufficient, the linearity of the V-I conversion is impaired in the case when the input signal is high.

However, if the current drive capability of the P-channel MOSFET 92 is simply improved, the sensitivity of the V-I conversion rises excessively, and PWM control in the current mode may not be carried out properly.

Hence, in addition to the improvement of the current drive capability of the P-channel MOSFET 92, the resistor 103 is connected to the drain thereof to restrict the flowing current. With this configuration, the response linearity is improved in a wide input voltage range, and the stability of PWM control is attained.

Even if the connection of the resistor 103 described in this modified embodiment is applied to the following embodiments, a similar effect can be obtained.

Embodiment 6

Figure 7:
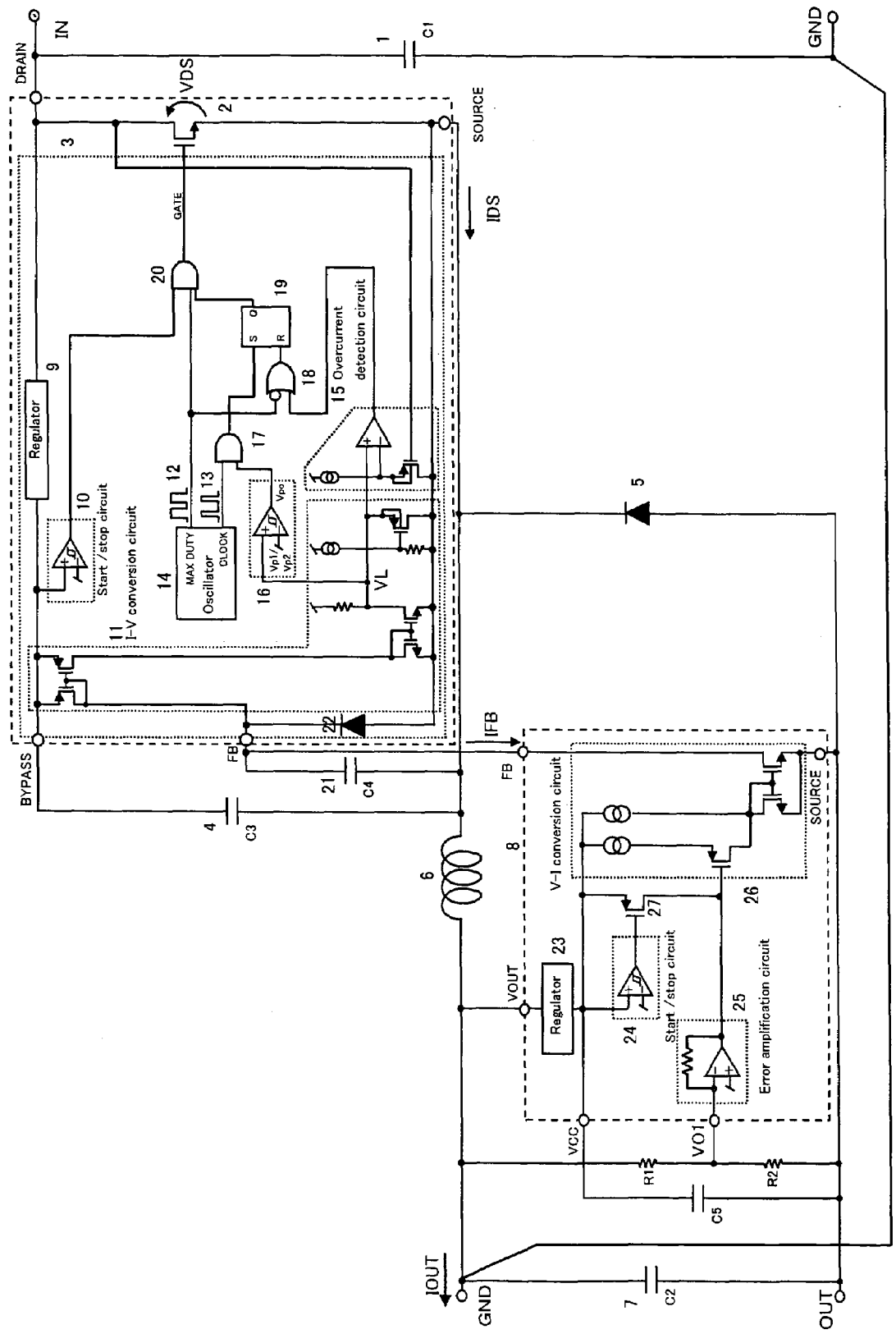
FIG. 7 is a circuit block diagram of a switching power supply apparatus in accordance with a sixth embodiment of the present invention.

FIG. 7 is a circuit block diagram of a switching power supply apparatus in accordance with a sixth embodiment of the present invention. Just as in the case of the second embodiment of the present invention shown in FIG. 3, the output of the switching power supply apparatus shown in FIG. 6A is made negative. The operation of the power supply apparatus is the same as that of the switching power supply apparatus in accordance with the first embodiment of the present invention.

In the case when this kind of switching power supply apparatus in accordance with the sixth embodiment of the present invention is used, the same effect as that of the first embodiment of the present invention is obtained.

Embodiment 7

Figure 8:
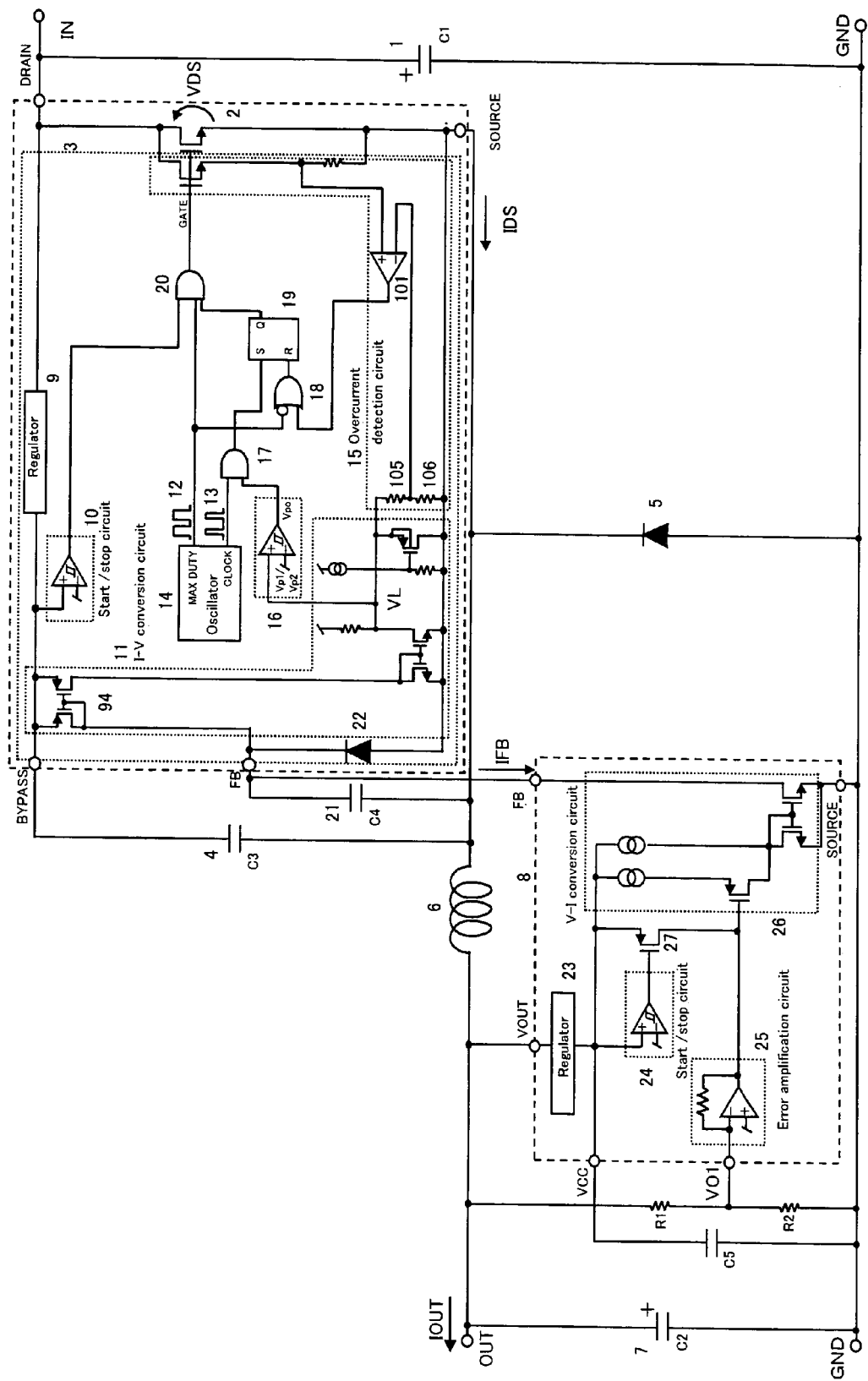
FIG. 8 is a circuit block diagram of a switching power supply apparatus in accordance with a seventh embodiment of the present invention.

FIG. 8 is a circuit block diagram of a switching power supply apparatus in accordance with a seventh embodiment of the present invention. The start/stop circuit 10, the I-V conversion circuit 11 and the overcurrent detection circuit 15 of the control circuit 3, and the start/stop circuit 24, the error amplification circuit 25 and the V-I conversion circuit 26 of the output voltage detection circuit 8 in accordance with the first embodiment shown in FIG. 1 are each formed of a second specific circuit in this embodiment. In the overcurrent detection circuit 15, a sense-MOSFET system is used. Numeral 101 designates a comparator, numerals 105 to 107 designate resistors, and numeral 108 designates a sense-MOSFET. The other components common to those shown in FIG. 6 are designated by the same numerals as those corresponding thereto. The operation of the power supply apparatus is the same as that of the switching power supply apparatus in accordance with the first embodiment of the present invention.

In comparison with the configuration shown in FIG. 6A, wherein the ON voltage of the switching device 2 is used as the input detection signal directly input to the overcurrent detection circuit 15 for overcurrent detection, the configuration shown in FIG. 8 differs in that the voltage signal, obtained when the current flowing in the sense-MOSFET 108 having a constant sense ratio with respect to the switching device 2 is converted by the resistor 107 connected in series with the SOURCE terminal of the sense-MOSFET

108, is used as the input detection signal input to the overcurrent detection circuit 15. In the case when the ON voltage is directly used as the input detection signal as shown in FIG. 6A, the ON voltage can be raised. However, when the sense-MOSFET 108 shown in FIG. 8 is used, the converted voltage must be very low in reality. Otherwise, the DRAIN-SOURCE voltage of the sense-MOSFET 108 becomes low, and operation becomes unstable. In this respect, there is a difference between the two configurations. When the switching device 2 is a high-voltage device, in the case of the configuration shown in FIG. 6A, it is necessary to provide some kind of means for protecting the input detection signal section, from which the input detection signal is input to the overcurrent detection circuit 15, against high voltage. However, in the case of the configuration shown in FIG. 8, the sense-MOSFET should only be formed of a high-voltage device having the same withstand voltage as that of the switching device 2.

In the overcurrent detection circuit 15 shown in FIG. 8, the reference voltage at the (−) terminal (reference voltage terminal) of the comparator 101 is the voltage obtained by voltage division using the two resistors 105 and 106. However, one resistor may be used without carrying out voltage division, or the output signal of the I-V conversion circuit 11 may be input to the reference voltage terminal of the comparator 101 without using resistors.

In the case when this kind of switching power supply apparatus in accordance with the seventh embodiment of the present invention is used, the same effect as that of the first embodiment of the present invention is obtained.

Embodiment 8

Figure 9:
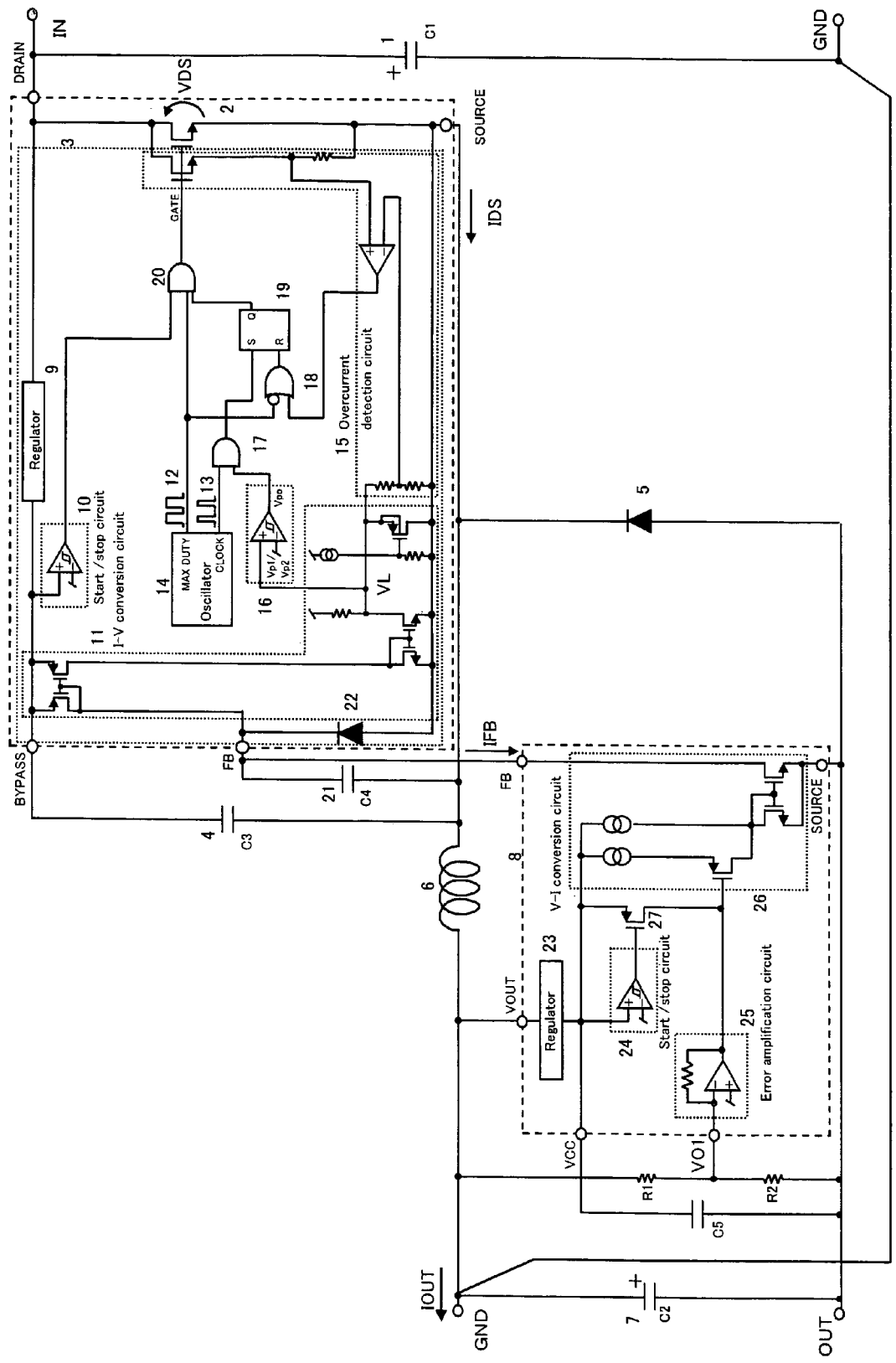
FIG. 9 is a circuit block diagram of a switching power supply apparatus in accordance with an eighth embodiment of the present invention.
Figure 10:
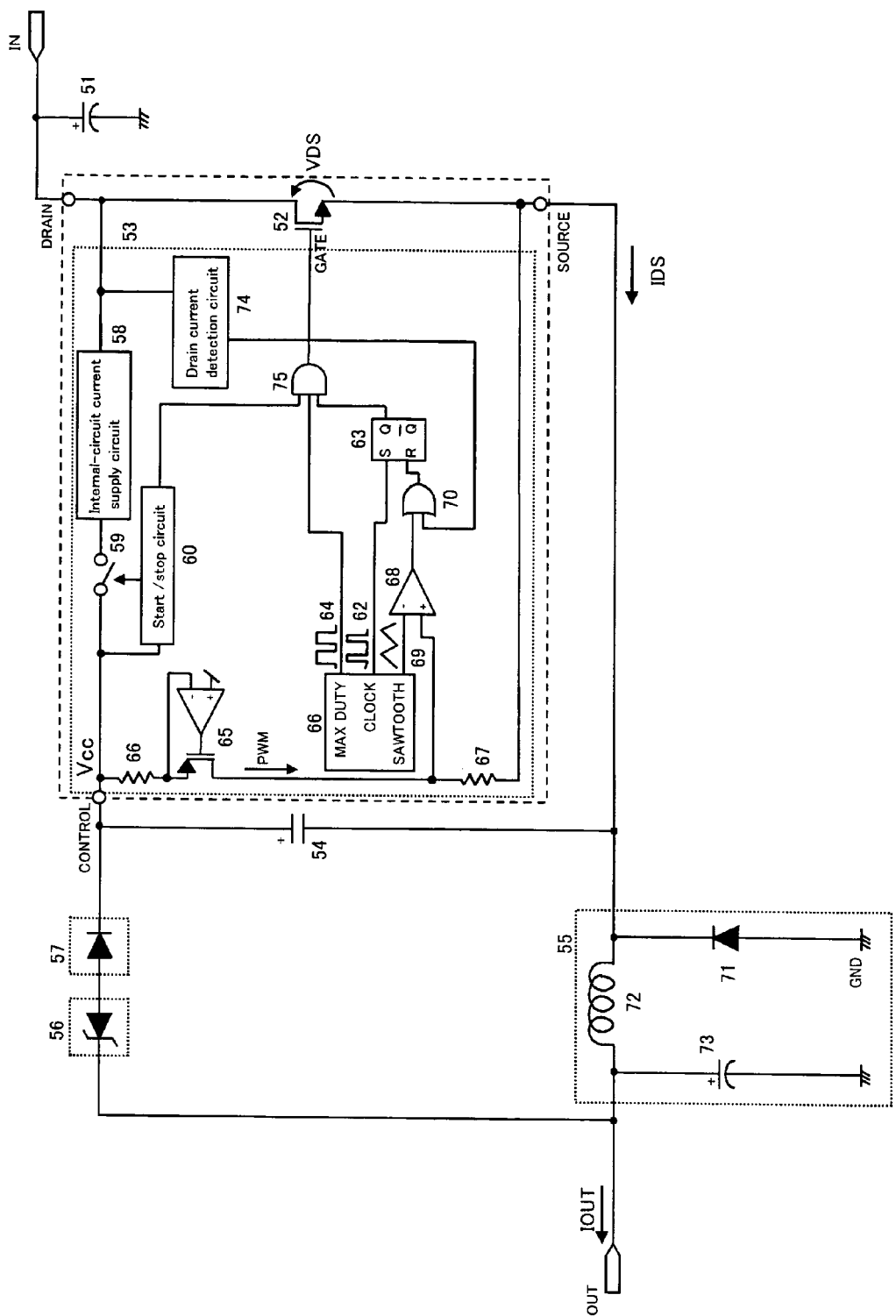
FIG. 10 is a circuit block diagram of the first conventional switching power supply apparatus.
Figure 11:
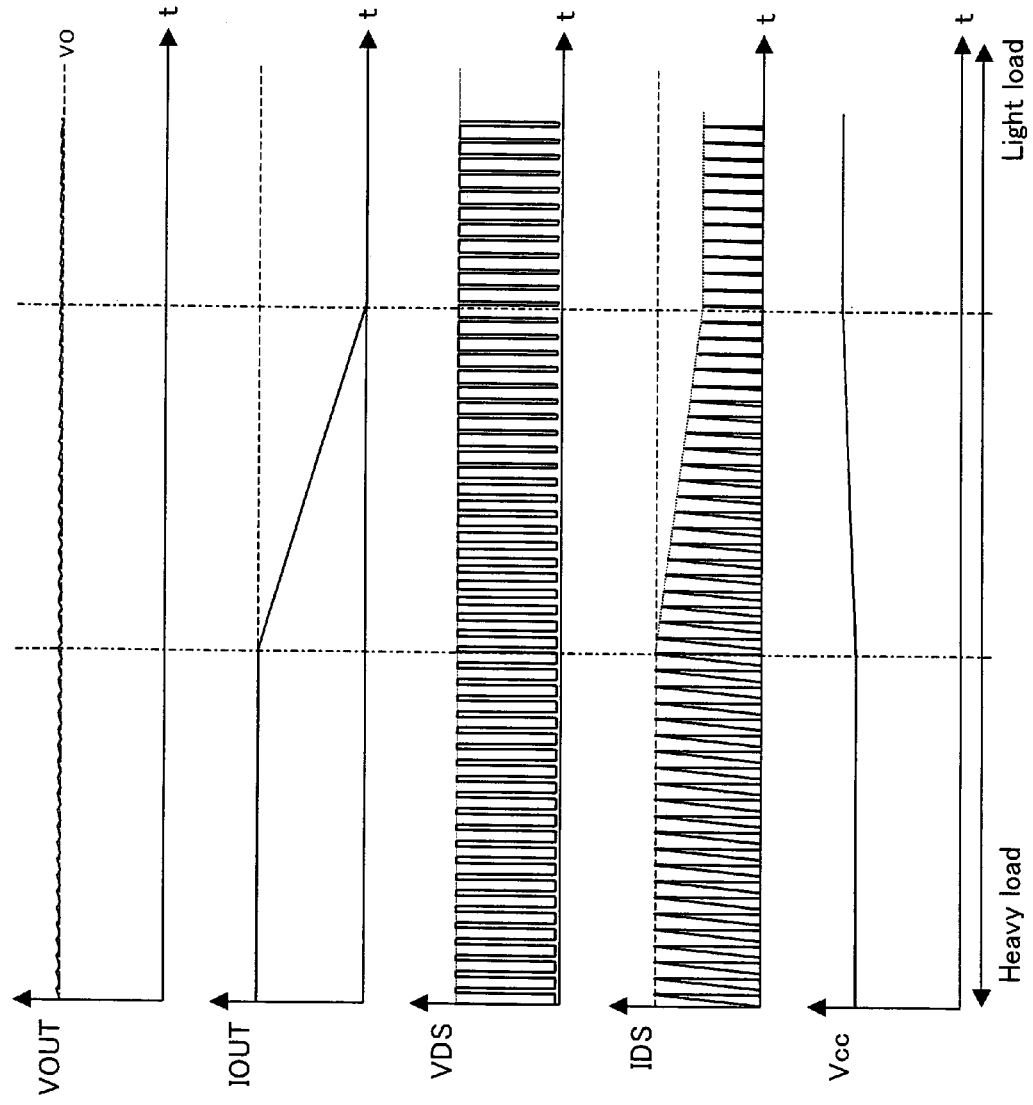
FIG. 11 is a graph showing the operation waveforms of the switching power supply apparatus shown in FIG. 10.
Figure 12:
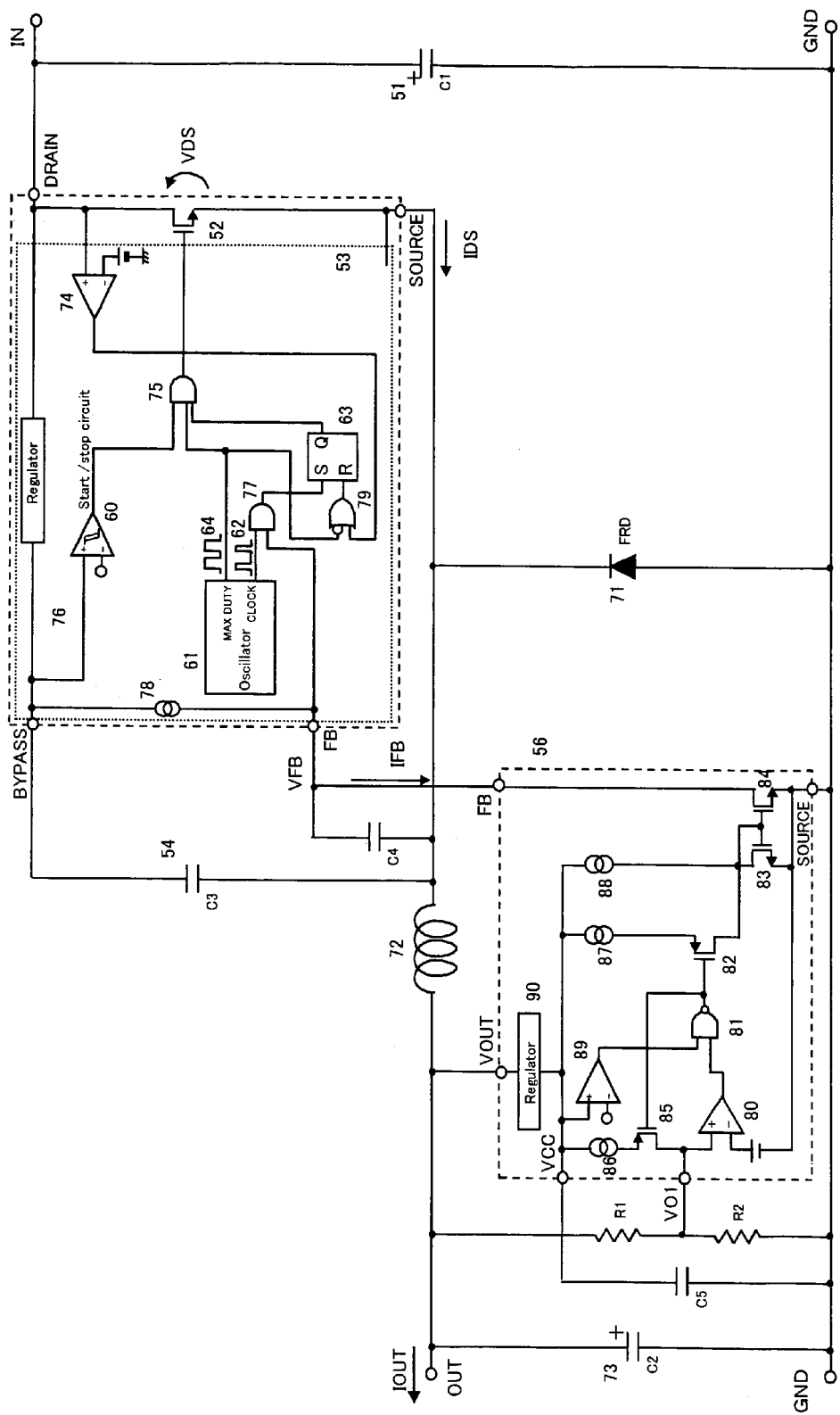
FIG. 12 is a circuit block diagram of the second conventional switching power supply apparatus.
Figure 13:
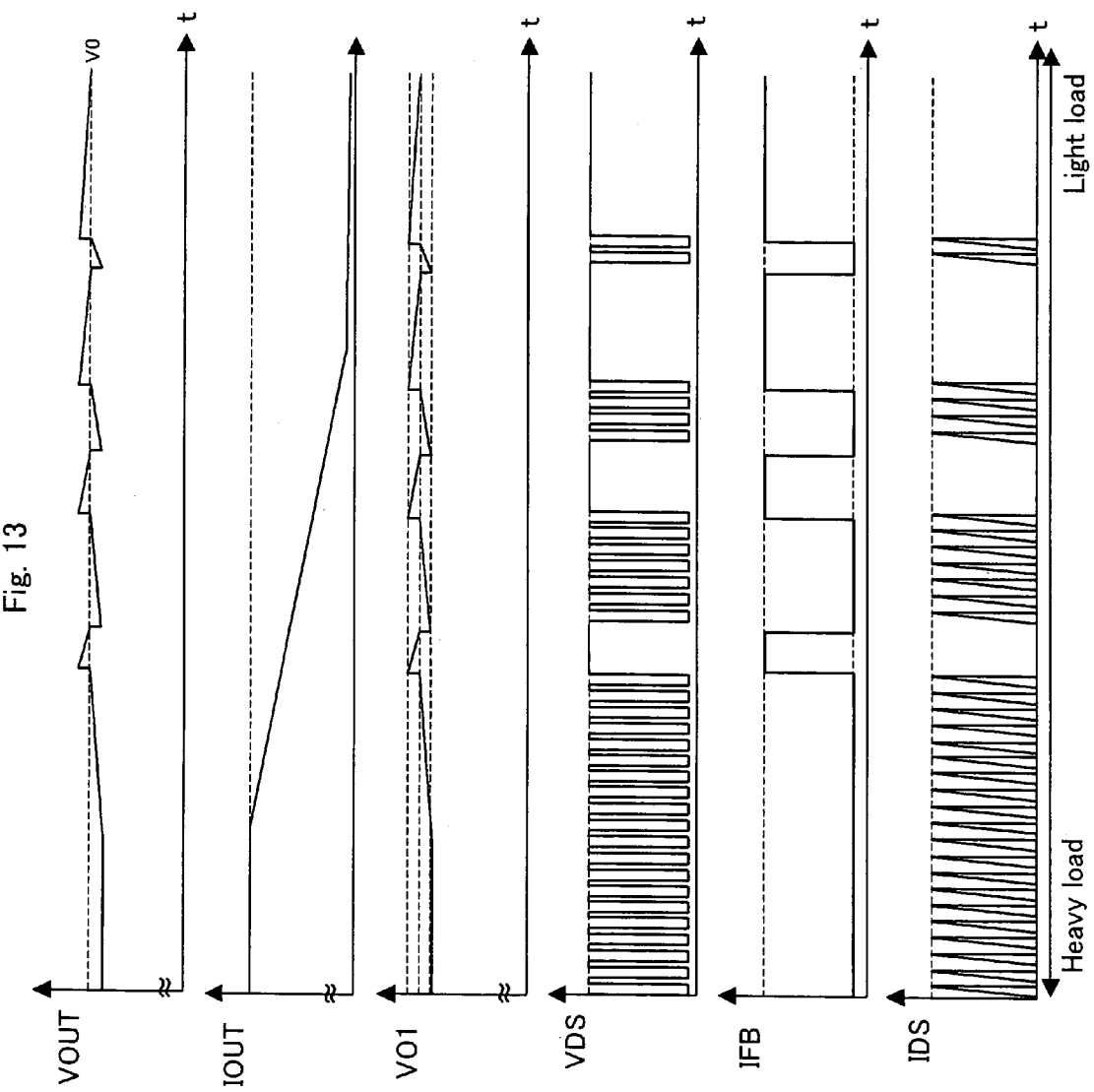
FIG. 13 is a graph showing the operation waveforms of the switching power supply apparatus shown in FIG. 12.

FIG. 9 is a circuit block diagram of a switching power supply apparatus in accordance with an eighth embodiment of the present invention. Just as in the case of the second embodiment of the present invention shown in FIG. 3, the output of the switching power supply apparatus shown in FIG. 8 is made negative. The operation of the power supply apparatus is the same as that of the switching power supply apparatus in accordance with the first embodiment of the present invention.

In the case when this kind of switching power supply apparatus in accordance with the eighth embodiment of the present invention is used, the same effect as that of the first embodiment of the present invention is obtained.

In the embodiments, devices other than MOSFETs, such as bipolar transistors, are also applicable.

The invention claimed is:

1. A switching power supply apparatus comprising:
a switching device for turning ON/OFF a first DC voltage,
a conversion circuit for converting the output of said switching device into a second DC voltage,
a control circuit for controlling said switching device,
a voltage detection circuit for detecting the output voltage of said conversion circuit,
a V-I conversion circuit for generating a current signal corresponding to the change in the output voltage of said voltage detection circuit, and
an I-V conversion circuit for outputting a voltage corresponding to the current signal of said V-I conversion circuit, for PWM controlling the switching operation of said switching device using said control circuit and for stopping and restarting the switching operation of said switching device.

2. A switching power supply apparatus comprising a switching device for turning ON/OFF a first DC voltage, an oscillator for generating a signal for ON/OFF controlling said switching device, an I-V conversion circuit, provided with an external signal input terminal, for outputting a voltage corresponding to the current flowing in said external signal input terminal, an overcurrent detection circuit for detecting the current flowing in said switching device by using the output voltage of said IV conversion circuit as a reference voltage and for turning OFF said switching device, an intermittent oscillation control circuit for stopping the switching operation of said switching device when the output voltage of said I-V conversion circuit becomes lower than a light-load detection lower-limit voltage and for restarting the switching operation of said switching device when said output voltage becomes higher than a light-load detection upper-limit voltage, a conversion circuit, connected to said switching device, for converting the output of said switching device into a second DC voltage, an error amplifier for detecting said second DC voltage and for amplifying the potential difference between said second DC voltage and a predetermined reference voltage, and a VI conversion circuit, having an output terminal connected to said external signal input terminal of said IV conversion circuit, for converting the output voltage of said error amplifier into a current.

3. A switching power supply apparatus comprising:
a switching device for turning ON/OFF a first DC voltage supplied via an input terminal,
an input-side smoothing capacitor, the high-potential side of which is connected to said input terminal and the low-potential side of which is connected to a ground terminal,
a control circuit having an oscillator for generating a signal for ON/OFF controlling said switching device; an I-V conversion circuit, connected to said input terminal via a first regulator and provided with an external signal input terminal, for outputting a voltage corresponding to the current flowing in said external signal input terminal; an overcurrent detection circuit for detecting the current flowing in said switching device by using the output voltage of said I-V conversion circuit as a reference voltage and for turned OFF said switching device; and an intermittent oscillation control circuit for stopping the switching operation of said switching device when the output voltage of said I-V conversion circuit becomes lower than a light-load detection lower-limit voltage and for restarting the switching operation of said switching device when the output voltage of said I-V conversion circuit becomes higher than a light-load detection upper-limit voltage,
a first capacitor, connected to said input terminal via said first regulator, for generating the reference voltage of said control circuit,
a conversion circuit, operating by using the potential at said ground terminal as a reference potential and connected to the output of said switching device, for converting the output, turned ON/OFF by said switching device, into a second DC voltage, the absolute value of which is smaller than that of said first DC voltage, and for outputting said second DC voltage to an output terminal,
an output-side smoothing capacitor, the high-potential side of which is connected to said output terminal and the low-potential side of which is connected to said ground terminal,
a first resistor, one end of which is connected to said output terminal, a second resistor, one end of which is connected to the other end of said first resistor and the other end of which is connected to said ground terminal, and an output voltage detection circuit operating by using the potential at said ground terminal as a reference potential and having a second capacitor, connected to said output terminal via a second regulator, for generating a power supply voltage; an error amplifier, to which the voltage obtained by dividing the voltage at said output terminal using said first resistor and said second resistor is input, for amplifying the potential difference between the obtained voltage and a predetermined reference voltage; and a V-I conversion circuit, the output terminal of which is connected to said external signal input terminal of said control circuit, for converting the output voltage of said error amplifier into a current.

4. A switching power supply apparatus in accordance with claim 3, having a second capacitor, connected to said input terminal via said second regulator, for generating said power supply voltage, instead of said second capacitor, connected to said output terminal via said second regulator, for generating said power supply voltage.

5. A switching power supply apparatus comprising:
a switching device for turning ON/OFF a first DC voltage supplied via an input terminal,
an input-side smoothing capacitor, the high-potential side of which is connected to said input terminal and the lowpotential side of which is connected to a ground terminal,
a control circuit having an oscillator for generating a signal for ON/OFF controlling said switching device; an I-V conversion circuit, connected to said input terminal via a first regulator and provided with an external signal input terminal, for outputting a voltage corresponding to the current flowing in said external signal input terminal; an overcurrent detection circuit for detecting the current flowing in said switching device by using the output voltage of said I-V conversion circuit as a reference voltage and for turned OFF said switching device; and an intermittent oscillation control circuit for stopping the switching operation of said switching device when the output voltage of said I-V conversion circuit becomes lower than a light-load detection lower-limit voltage and for restarting the switching operation of said switching device when the output voltage of said I-V conversion circuit becomes higher than a light-load detection upper-limit voltage,
a first capacitor, connected to said input terminal via said first regulator, for generating the reference voltage of said control circuit,
a conversion circuit, operating by using the potential at an output terminal as a reference potential and connected to the output of said switching device, for converting the output, turned ON/OFF by said switching device, into a second DC voltage, the absolute value of which is smaller than that of said first DC voltage, and for outputting said second DC voltage to said ground terminal,
an output-side smoothing capacitor, the high-potential side of which is connected to said ground terminal and the low-potential side of which is connected to said output terminal,
a first resistor, one end of which is connected to said ground terminal,
a second resistor, one end of which is connected to the other end of said first resistor and the other end of which is connected to said output terminal, and an output voltage detection circuit operating by using the potential at said output terminal as a reference potential and having a second capacitor, connected to said ground terminal via a second regulator, for generating a power supply voltage; an error amplifier, to which the voltage obtained by dividing the voltage at said output terminal using said first resistor and said second resistor is input, for amplifying the potential difference between the obtained voltage and a predetermined reference voltage; and a V-I conversion circuit, the output terminal of which is connected to said external signal input terminal of said control circuit, for converting the output voltage of said error amplifier into a current.

6. A switching power supply apparatus in accordance with claim 5, having a second capacitor, connected to said input terminal via said second regulator, for generating said power supply voltage, instead of said second capacitor, connected to said ground terminal via said second regulator, for generating said power supply voltage.

7. A switching power supply apparatus in accordance with claim 3, wherein said output voltage detection circuit and said control circuit are configured so that the peak value of the current flowing when said switching device is in the ON state changes linearly with respect to the change in the voltage at said output terminal.

8. A switching power supply apparatus in accordance with claim 3, having a diode, the cathode of which is connected to the external signal input terminal of said I-V conversion circuit and the anode of which is connected to the output terminal of said switching device.

9. A switching power supply apparatus in accordance with claim 3, wherein said switching device is a high-voltage transistor.

10. A switching power supply apparatus in accordance with claim 3, wherein said conversion circuit comprises a series circuit of a diode, a coil and a capacitor.

11. A switching power supply apparatus in accordance with any one of claims 3 to 10, further comprising an overcurrent protection section.

12. A switching power supply apparatus in accordance with any one of claims 3 to 10, further comprising an overcurrent protection section and an overheat protection section.

13. A switching power supply apparatus in accordance with claim 4, wherein said output voltage detection circuit and said control circuit are configured so that the peak value of the current flowing when said switching device is in the ON state changes linearly with respect to the change in the voltage at said output terminal.

14. A switching power supply apparatus in accordance with claim 5, wherein said output voltage detection circuit and said control circuit are configured so that the peak value of the current flowing when said switching device is in the ON state changes linearly with respect to the change in the voltage at said output terminal.

15. A switching power supply apparatus in accordance with claim 6, wherein said output voltage detection circuit and said control circuit are configured so that the peak value of the current flowing when said switching device is in the ON state changes linearly with respect to the change in the voltage at said output terminal.

16. A switching power supply apparatus in accordance with claim 4, having a diode, the cathode of which is connected to the external signal input terminal of said I-V conversion circuit and the anode of which is connected to the output terminal of said switching device.

17. A switching power supply apparatus in accordance with claim 5, having a diode, the cathode of which is connected to the external signal input terminal of said I-V conversion circuit and the anode of which is connected to the output terminal of said switching device.

18. A switching power supply apparatus in accordance with claim 6, having a diode, the cathode of which is connected to the external signal input terminal of said I-V conversion circuit and the anode of which is connected to the output terminal of said switching device.

19. A switching power supply apparatus in accordance with claim 7, having a diode, the cathode of which is connected to the external signal input terminal of said I-V conversion circuit and the anode of which is connected to the output terminal of said switching device.

20. A switching power supply apparatus in accordance with claim 5, wherein said switching device is a high-voltage transistor.

21. A switching power supply apparatus in accordance with claim 4, wherein said conversion circuit comprises a series circuit of a diode, a coil and a capacitor.

22. A switching power supply apparatus in accordance with claim 5, wherein said conversion circuit comprises a series circuit of a diode, a coil and a capacitor.

23. A switching power supply apparatus in accordance with claim 6, wherein said conversion circuit comprises a series circuit of a diode, a coil and a capacitor.

24. A switching power supply apparatus in accordance with claim 7, wherein said conversion circuit comprises a series circuit of a diode, a coil and a capacitor.

25. A switching power supply apparatus in accordance with claim 8, wherein said conversion circuit comprises a series circuit of a diode, a coil and a capacitor.

26. A switching power supply apparatus in accordance with claim 9, wherein said conversion circuit comprises a series circuit of a diode, a coil and a capacitor.

* * * * *